May 22, 1934.    W. A. MOORSHEAD    1,960,162
HEAT CONTROL SYSTEM FOR FURNACES AND THE LIKE
Filed Nov. 3, 1928
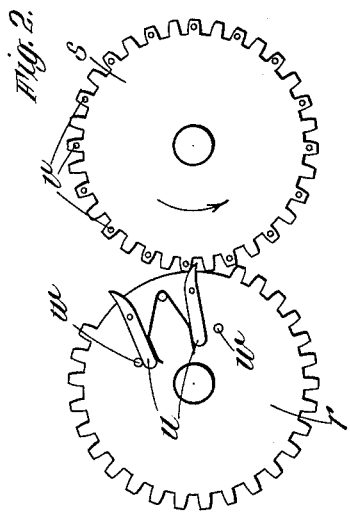
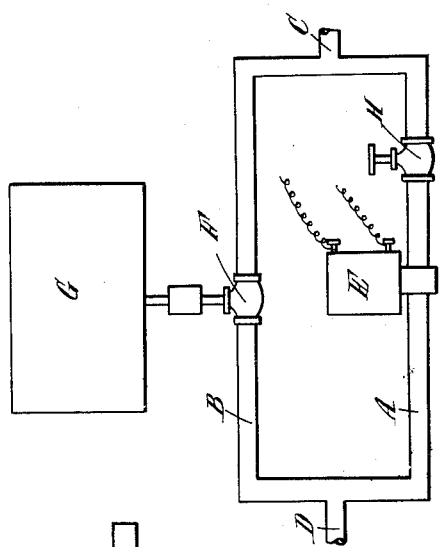
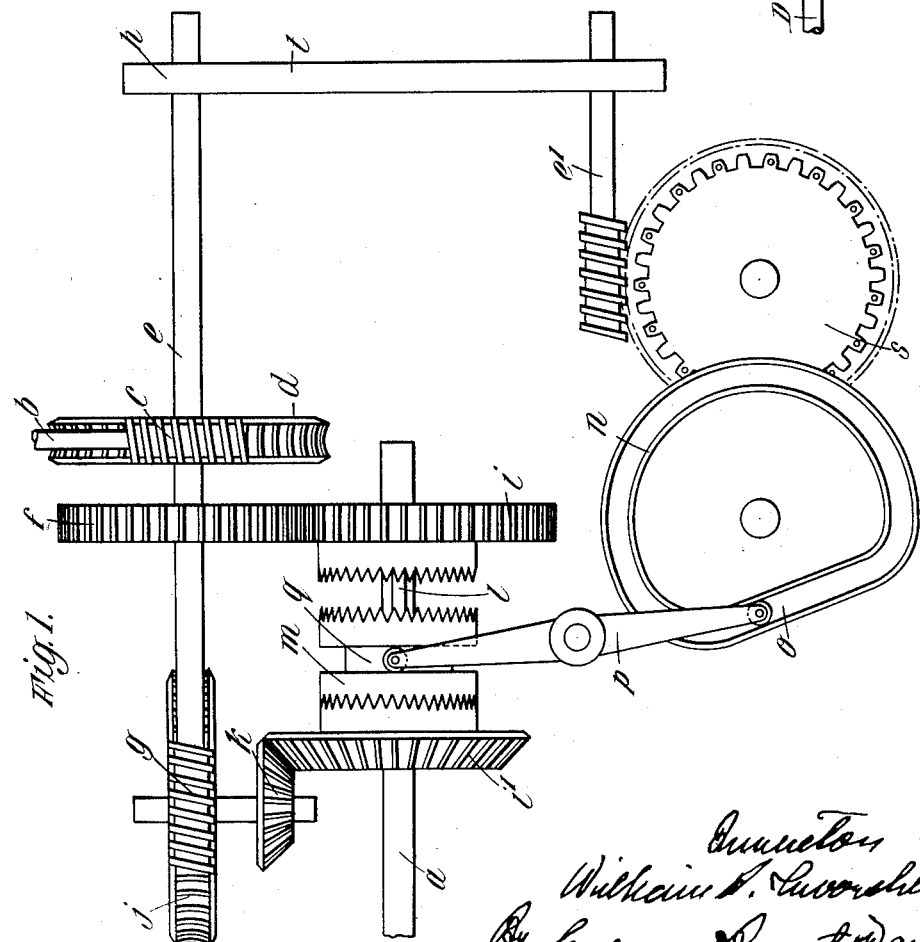

Patented May 22, 1934

1,960,162

UNITED STATES PATENT OFFICE

1,960,162

HEAT CONTROL SYSTEM FOR FURNACES AND THE LIKE

William Alfred Moorshead, Strand, London, England, assignor to The United Glass Bottle Manufacturers, Limited, London, England Application November 3, 1928, Serial No. 317,040
In Great Britain January 23, 1928

13 Claims. (Cl. 236—69)

This invention relates to automatic heat control systems for furnaces and the like of the type in which the supply of fuel (or fuel and air) is made dependent upon the temperature prevailing in the furnace. Usually in control systems of this type a pyrometer, which may be of the electrical, radiation, expansion or other type is employed to open and close a valve controlling the quantity of fuel delivered, and sometimes the quantity of air admitted, to the furnace. In some instances, the arrangement is such that when the temperature, as recorded by the pyrometer, rises above some predetermined value or attains a maximum value the valve controlling the supply of fuel to the furnace is closed by a predetermined amount with the result that the temperature subsequently falls and on reaching either the same predetermined value or another predetermined minimum value the valve is opened again. Such an arrangement may be described as a single step control. In others, the arrangement is such that the valve controlling the supply of fuel to the furnace opens slowly but continuously, or in a step by step manner, until the temperature attains a predetermined or maximum value, and then closes in a similar manner until the predetermined temperature is passed or a minimum temperature is reached. The first mentioned arrangement or single step control although able to compensate for the usual small short period fluctuations of temperature which are constantly occurring or tending to occur, is not able to counteract any tendency there may be for long period temperature oscillations of large amplitude to be set up, as for instance, when a large change in heat losses occurs following a change in atmospheric conditions or when a substantial change in the output of the furnace is required unless the valves are set so that the quantity of fuel turned on and off is large a procedure which is open to several disadvantages. On the other hand the other arrangement or step by step control is satisfactory for the correction of the long period temperature fluctuations but owing to the inevitable time lag between the temperature prevailing in the furnace and the action of the control is not able to counteract the tendency for short period oscillations to be set up. The object of the present invention is to provide an improved control system by which the disadvantages above set forth may be readily overcome and a substantially constant temperature maintained.

According to the invention the control is such that whenever the temperature reaches a maximum value or rises above some predetermined value, the supply of fuel (or fuel and air) to the furnace is cut off or reduced quickly by a predetermined and relatively large amount and thereafter the control continues to cut off or reduce the fuel supply at a relatively slow rate and by a relatively smaller amount until a minimum temperature is reached or the predetermined temperature is again attained or recorded. On the temperature reaching this minimum value or falling below the predetermined value the control is brought into action in the opposite sense so that the predetermined amount of fuel above referred to is turned on quickly and then the slow motion operation proceeds until the temperature again reaches its maximum or its predetermined value and these operations are repeated whenever the temperature deviates from the predetermined value or reaches one of the limiting values. The amount of fuel turned on and off quickly should be sufficient to counteract any tendency for small short period temperature oscillations to be set up while the slow motion operation is adapted to compensate for or counteract the long period oscillations. For controlling the amount of fuel supplied, one or more valves may be employed and means may be provided whereby the valve or valves are given a quick movement followed by a relatively slow one. Alternatively the valve or valves may be given a relatively large movement followed by a series of smaller movements.

If desired, two valves controlling the supply of fuel to the burners may be employed and controlled so that one is given a quick or large movement and the other is given a slow or smaller movement. In such a case the two valves may be arranged in parallel paths or conduits so that one completely cuts off or admits fuel through one conduit according to whether the temperature is too high or too low and the other, a regulating valve, arranged in the other conduit, slowly follows the opening and closing movements of the cut-off valve. For instance, the cut-off valve may be of the solenoid controlled type and the regulating valve may be adapted to be operated from a motor so that it slowly opens while the solenoid controlled valve is open and slowly closes while the solenoid controlled valve is closed.

Where one or more valves are employed and controlled so that they are given first a quick or relatively large movement and then a relatively slow or smaller movement or movements the valve or valves may be arranged so that they are capable of movement through gearing in both directions by a reversible motor, a cam controlled clutch mechanism being provided so that upon each reversal of the motor the cam causes the clutch mechanism to operate so that the valve or valves are first actuated from the motor through one set of gearing and thereafter through another set of gearing having a larger gearing ratio.

In order that the said invention may be clearly understood and readily carried into effect, the same will now be more fully described with reference to the accompanying drawings, in which:—

Figure 1 shows diagrammatically an arrangement for controlling the supply of fuel by one or more valves adapted to be actuated from a reversible motor through two sets of gearing.

Figure 2 is a detail view of a part of the arrangement shown in Figure 1, and

Figure 3 shows diagrammatically an arrangement for controlling the supply of fuel by two valves arranged in parallel conduits.

In Figure 1 $a$ is a shaft for operating one or more valves so that they receive two kinds of movement and $b$ is a shaft connected to the reversible motor (not shown). $c$ is a worm provided on the shaft $b$ and adapted to gear with a worm wheel $d$ secured to a shaft $e$. Mounted on the shaft $e$ are a gear wheel $f$, a worm $g$ and a pulley $h$, the gear wheel $f$ being in mesh with another gear wheel $i$ which is loosely mounted on the shaft $a$ so that it is free to rotate thereon and the worm $g$ being connected through a worm wheel $j$ and bevel gear $k$ to a bevel gear $i^1$ which is also loosely mounted on the shaft $a$. The opposite faces of the gear wheel $i$ and the bevel gear $i^1$ are each formed with a part of a claw or toothed coupling and between these two gear wheels there is slidably mounted on the shaft $a$ by a key $l$ a double faced coupling member $m$ having similar claws or teeth, the arrangement being such that when the member $m$ is in the position shown the shaft $a$ will be driven through the bevel gear $i^1$ or in "low" gear and when it is moved to its right-hand operative position the shaft will be driven through the gear wheel $i$ or in "high" gear. $n$ is the cam by which the movements of the slidable coupling member $m$ are controlled. The said cam consists of a rotatably mounted disc having an endless cam track which is concentric therewith for the greater part of its length and is completed by a straight part $o$ lying along a chord of the disc. A lever $p$ is pivoted at a point between the coupling member $m$ and the cam $n$ so that a roller carried at one end of the lever is embraced by the walls of a groove $q$ formed in the coupling member while another roller carried at the other end of the lever engages with the endless cam track. The position of the pivot of the lever $p$ and the length of the straight part of the cam track are such that during a rotary movement of the cam the coupling member $m$, whilst the roller at the lower end of the lever $p$ is in engagement with the straight part of the cam, will be moved from one of its operative positions into the other and back again.

The cam disc is also formed with or connected to a mutilated gear wheel $r$ which is adapted to be rotated through substantially one revolution in one direction or the other (depending upon the direction of rotation of the reversible motor) by another gear wheel $s$ which is adapted to be driven in any suitable manner from the shaft $e$. For instance, a worm and worm wheel drive may be obtained from a shaft $e'$ connected by a belt $t$ with the pulley $n$ on the shaft $e$. Adjacent the mutilated part of the gear wheel $r$ there are pivotally mounted thereon a pair of spring pressed pawls $u$ which extend outwardly so as to engage a series of lugs or projecting pins $v$ carried by the teeth (or certain of them) of the gear wheel $s$. Stops $w$ are provided for limiting the extent to which the pawls may be moved about their pivots. By this arrangement the gear wheel $r$ and the cam $n$ will be rotated (by the engagement of the teeth of wheels $r$ and $s$) through nearly one revolution at each reversal of the motor until the mutilated part of the gearwheel $r$ comes opposite the gear wheel $s$. The teeth of the gear wheel $s$ will then move idly past the wheel $r$ with their lugs or pins $v$ merely rocking one of the pawls $u$ on its pivot until another reversal occurs when the pawl which is in engagement with the lugs or pins will be moved by such lugs or pins in the opposite direction so that its opposite end is brought into contact with its stop $w$ and the wheel $r$ rotated until its teeth are again meshing with those of the wheels $s$.

In practice the pyrometer is connected with a switch or clutch for controlling the direction of rotation of the reversible motor and each time the temperature deviates from the predetermined value or reaches one of the predetermined limiting values the motor is operated to cause a rotary movement of the cam $n$ which, in the arrangement illustrated, will be an anti-clockwise one. This causes the lever $p$ to be moved about its pivot so that the coupling member $m$ engages the coupling part associated with the gear wheel $i$ and the valve operating shaft $a$ is driven through the "high" gear. The action continues so long as the curved part of the cam track is in engagement with the roller on the lower end of the lever $p$ but as soon as the straight part of the cam track comes into engagement with the roller the coupling member is moved into its other operative position and the shaft $a$ is driven through the "low" gear. As the wheel $r$ and the cam $n$ are now brought to rest the shaft $a$ will continue to be so driven until the temperature variation is corrected or the temperature again deviates from its predetermined value or reaches its other limiting value and another reversal of the motor occurs when the cam will be rotated in the opposite direction and the actions repeated. Any suitable form of safety device may be provided for stopping the motor or rendering it ineffective when the valve reaches either of its extreme positions. In cases where the supply of fuel and air is to be controlled the shaft $a$ may be suitably connected by gearing with the air valve shaft so that both the fuel and the air valves are influenced by the control.

In Figure 3, A and B are the parallel fuel conduits which are connected at one end with a pipe C in communication with a source of fuel supply and at the other end with a pipe D leading to the fuel burners. E is the solenoid valve which is arranged in the conduit A and is adapted completely to cut-off or admit fuel through that conduit according to whether the temperature recorded by the pyrometer is too high or too low. For this purpose any suitable switch adapted to be controlled by the pyrometer may be arranged in the circuit leading to the solenoid. F is the regulating valve which is arranged in the conduit B and is suitably connected with a motor G so that it may be moved continuously in such a manner that it will slowly open while the solenoid valve is open and slowly close while the solenoid valve is shut, the reversing arrangement (which may be mechanically or electrically operated) being under the control of the pyrometer, its switch or the solenoid by which the solenoid valve is operated. H is an adjustable valve arranged in the conduit A for enabling the quantity of fuel cut-off by the solenoid valve to be regulated. The arrangement is preferably such that the solenoid valve E controls a comparatively small proportion of the total fuel supplied to the burners whilst the regulating valve F controls the supply of the remainder. In operation as soon as the temperature deviates from the predetermined value or reaches one of the predetermined limiting values the solenoid valve E is operated through the medium of the pyrometer to cut-off or admit fuel through the conduit A according to whether the temperature is too high or too low and thereafter the regulating valve slowly follows the movement of the solenoid valve until the temperature variation is corrected or the temperature again deviates from the predetermined value or reaches its other limiting value and the solenoid valve is again operated.

In the following claims the term "fuel" is used to include fuel and air. It is to be understood that what is meant by the terms "relatively large amount" and "relatively small amount" herein referred to is a large or relatively small amount of that proportion of the total fuel supply which is turned on or off throughout the regulating period.

What I claim and desire to secure by Letters Patent of the United States is:—

1. A temperature control system for furnaces and the like comprising a valve for controlling the supply of fuel to the furnace, means for imparting movement to the valve, gearing interposed between the valve and the said means, and means whereby whenever the temperature reaches too high a value the valve is actuated through one set of gearing to cut off a predetermined amount of the fuel supply quickly and is thereafter actuated through another set of gearing to reduce the fuel supply at a slower rate until the temperature variation is corrected.

2. A temperature control system for furnaces and the like comprising a valve for controlling the supply of fuel to the furnace, means for imparting movement to the valve, two sets of gearing of different gear ratios interposed between the valve and the said means and a cam controlled clutch mechanism adapted whenever the temperature deviates from some predetermined value to cause movement to be imparted to the valve first through the set of gearing of smaller gear ratio and then through the set of gearing of larger gear ratio.

3. A temperature control system for furnaces and the like comprising a valve for controlling the supply of fuel to the furnace, a reversible motor for imparting movement to the valve, gearing interposed between the valve and the reversible motor and means whereby whenever the temperature reaches too high a value the valve is actuated first through one set of gearing to cut off a predetermined amount of the fuel supply quickly and is thereafter actuated through another set of gearing of larger gear ratio to reduce the fuel supply at a slower rate until the temperature variation is corrected.

4. A temperature control system for furnaces and the like comprising a valve for controlling the supply of fuel to the furnace, a reversible motor for imparting movement to the valve, two sets of gearing of different gear ratios interposed between the valve and the said means, and a cam controlled clutch mechanism adapted whenever the temperature deviates from some predetermined value to cause movement to be imparted to the valve first through the set of gearing of smaller gear ratio and then through the set of gearing of larger gear ratio, the cam being so connected with the motor that it is caused to operate the clutch mechanism each time a reversal of the motor occurs.

5. A temperature control system for furnaces and the like comprising a valve for controlling the supply of fuel to the furnace, a reversible motor for imparting movement to the valve, two sets of gearing of different gear ratios interposed between the valve and the said means, and a cam controlled clutch mechanism adapted whenever the temperature deviates from some predetermined value to cause movement to be imparted to the valve first through the set of gearing of smaller gear ratio and then through the set of gearing of larger gear ratio, the cam being so connected with the motor that it is caused to operate the clutch mechanism each time a reversal of the motor occurs, and the connection from the motor to the cam comprising a mutilated gear wheel.

6. A temperature control system for furnaces and the like comprising a valve for controlling the supply of fuel to the furnace, means for imparting movement to the valve, a cam adapted whenever the temperature deviates from some predetermined value to be actuated to cause the said means to move the valve so that it is given a quick initial movement followed by a slower movement until the fuel supply is adjusted and the temperature variation corrected.

7. A temperature control system for furnaces and the like comprising a valve for controlling the supply of fuel to the furnace, a reversible motor for imparting movement to the valve and provided with means for reversing its direction of rotation each time a temperature variation occurs, a cam adapted to be rotated through one revolution each time the direction of rotation of the rotor is reversed and means operable by the cam for causing the motor to impart to the valve a quick initial movement followed by a slower movement each time the cam is actuated.

8. A temperature control system for furnaces and the like comprising a valve for controlling the supply of fuel to the furnace, means for imparting movement to the valve, gearing interposed between the valve and the said means, a cam adapted through the medium of a mutilated gear wheel to be rotated through one revolution each time a temperature variation occurs, a clutch operable by the cam so that each time a temperature variation occurs the valve is moved by the said means first through one set of gearing and then through another set of gearing of a larger gear ratio until the temperature variation is corrected.

9. A temperature control system for furnaces and the like comprising a pair of valves for controlling the supply of fuel to the furnace, the said valves being situated one in each of a pair of fuel conduits arranged in parallel, means whereby one of the valves is caused to cut off the supply of fuel through its conduit whenever the temperature reaches too high a value, and means whereby the other valve is caused slowly to follow the movements of the first valve.

10. A temperature control system for furnaces and the like comprising a pair of valves for controlling the supply of fuel to the furnace, the said valves being arranged in parallel fuel conduits, one of the valves being of the solenoid controlled type and adapted to cut off fuel through its conduit whenever the temperature reaches too high a value and the other valve being a regulating valve adapted slowly to close while the solenoid controlled valve is closed and slowly to open while the solenoid controlled valve is open.

11. A method of controlling the temperature of a fuel burning furnace, which comprises adjusting the supply of fuel quickly by a predetermined and relatively large amount whenever the temperature deviates from a predetermined value and thereafter adjusting the supply at a slower rate and by a relatively smaller amount in the same direction, and continuing this second rate of adjustment until the temperature variation is corrected.

12. In combination with a main mechanism, the movement of which tends to cause a change in a measurable condition, a control couple the elements of which are relatively moved in accordance with the changes in said condition, a power device for adjusting said mechanism adapted to be energized by operation of said couple, said device when energized effecting an initial movement of said mechanism from such given position as it occupied previously and a continued response at a different rate.

13. The method of regulating the flow of fluid to a point of application to control a variable condition thereat which is affected by said flow, which method comprises continuously varying the flow of fluid so that the said condition alternately reaches maximum and minimum values above and below a desired mean value, and reversing the direction of variation when the maximum and minimum values are reached, and after each reversal varying the said condition in the same direction, until the next reversal, and immediately upon each reversal varying said flow quickly by a relatively large predetermined amount and thereupon continuing to vary said flow in the same direction but at a much slower rate of variation until the next reversal of direction, said rate and the extent of said large amount being both independent of the value of said condition.

WILLIAM ALFRED MOORSHEAD.